(12) United States Patent
Gerner et al.

(10) Patent No.: US 6,596,058 B2
(45) Date of Patent: Jul. 22, 2003

(54) FILM DEGASSING SYSTEM

(75) Inventors: Yuri Gerner, Mendota Heights, MN (US); Carl W. Sims, St. Paul, MN (US)

(73) Assignee: Systec, Inc., New Brighton, MA (US)

( * ) Notice: Subject to any disclaimer, the term of this patent is extended or adjusted under 35 U.S.C. 154(b) by 77 days.

(21) Appl. No.: 09/906,154

(22) Filed: Jul. 16, 2001

(65) Prior Publication Data

US 2003/0010213 A1 Jan. 16, 2003

(51) Int. Cl.[7] .................... B01D 19/00; B29C 39/00
(52) U.S. Cl. ................. 96/193; 95/266; 55/DIG. 5; 264/102; 264/259; 264/260; 264/299; 264/331.14; 264/DIG. 48; 264/DIG. 62
(58) Field of Search ................... 96/6, 193; 95/45, 95/266; 55/DIG. 5; 264/259, 260, DIG. 48, DIG. 62, 331.14, 299, 102

(56) References Cited

U.S. PATENT DOCUMENTS

| 3,523,408 | A | * | 8/1970 | Rosenberg |
| 3,735,562 | A | * | 5/1973 | Mousseau, Jr. et al. |
| 3,909,218 | A | * | 9/1975 | Kumura et al. |
| 4,302,223 | A | * | 11/1981 | Booth et al. |
| 4,484,936 | A | * | 11/1984 | Sakai |
| 4,515,606 | A | * | 5/1985 | de Winter |
| 4,529,419 | A | * | 7/1985 | Perl et al. |
| 5,019,140 | A | * | 5/1991 | Bowser et al. |
| 5,053,060 | A | * | 10/1991 | Kopf-Sill et al. |
| 5,186,824 | A | | 2/1993 | Anderson et al. |
| 5,248,428 | A | | 9/1993 | Hagen et al. |
| 5,340,384 | A | | 8/1994 | Sims |
| 5,352,360 | A | | 10/1994 | Stillian et al. |
| 5,538,538 | A | | 7/1996 | Glatz et al. |
| 5,670,053 | A | | 9/1997 | Collentro et al. |
| 5,693,122 | A | | 12/1997 | Berndt |
| 5,779,763 | A | | 7/1998 | Pinnau et al. |
| 5,830,261 | A | | 11/1998 | Hamasaki et al. |
| 5,980,742 | A | | 11/1999 | Saitoh |
| 6,077,434 | A | | 6/2000 | Srinivasan et al. |
| 6,258,154 | B1 | * | 7/2001 | Berndt et al. |

FOREIGN PATENT DOCUMENTS

| EP | 0 973 031 A1 | | 1/2000 |
| JP | 56-76205 | * | 6/1981 |
| JP | 62-42708 | * | 2/1987 |
| JP | 64-43311 | * | 2/1989 |
| JP | 4-4002 | * | 1/1992 |
| JP | 4-141205 | * | 5/1992 |

* cited by examiner

Primary Examiner—Duane S. Smith
(74) Attorney, Agent, or Firm—Haugen Law Firm PLLP

(57) ABSTRACT

A flow-through vacuum degassing unit for degassing a mobile phase in liquid chromatography applications includes a relatively flat self-supporting thin membrane disposed in a compact degassing component, whereby the thin membrane is gas-permeable and liquid-impermeable to selectively degas a mobile phase. The self-supporting thin membrane is disposed on a permeable substrate through which a vacuum is drawn by a connected vacuum source. In a particular embodiment, the self-supporting membrane may be directly cast on the permeable substrate through a solvent-free thermal process.

14 Claims, 6 Drawing Sheets

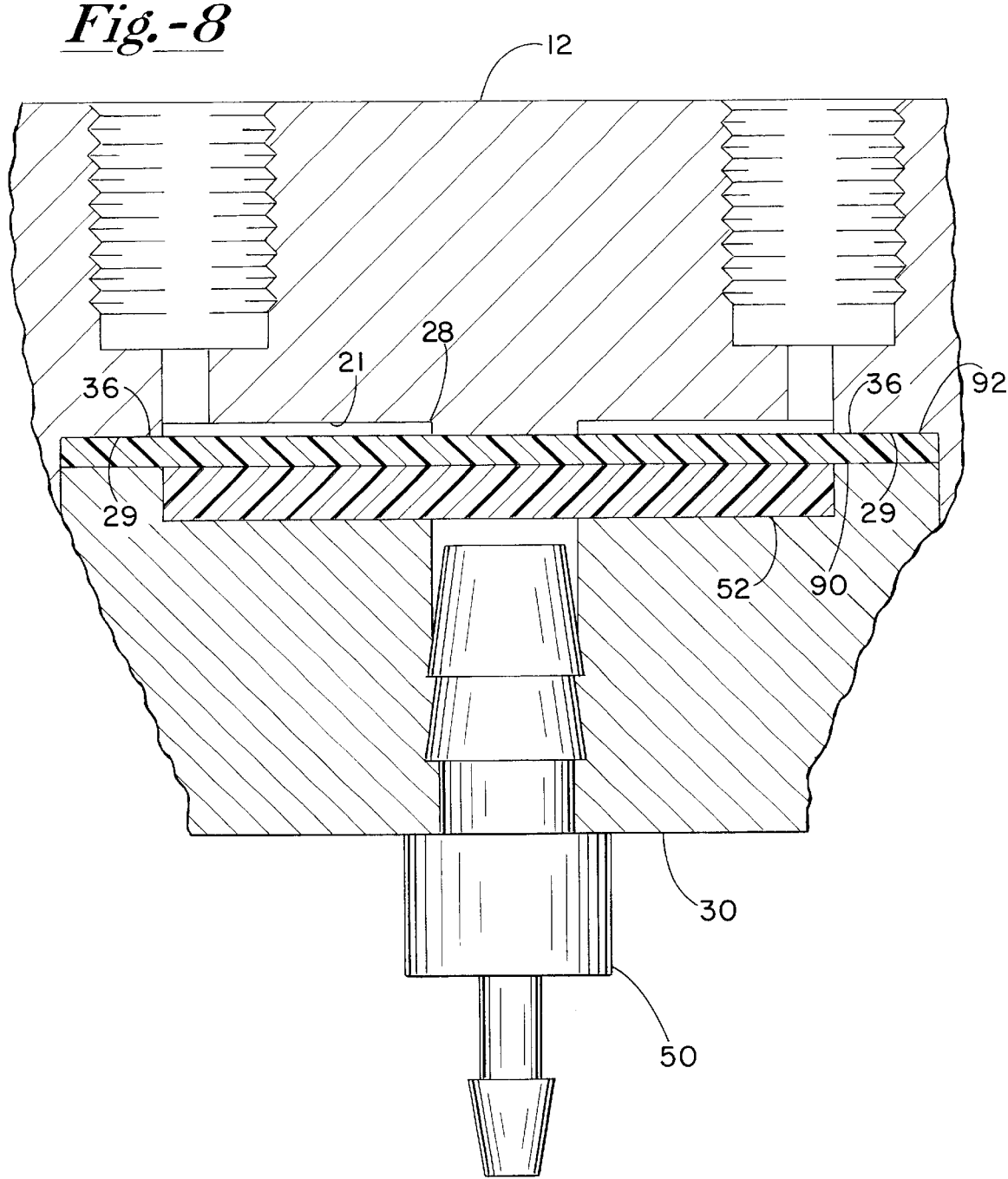

FILM DEGASSING SYSTEM

FIELD OF THE INVENTION

The present invention relates to vacuum degassing systems generally, and more particularly to systems for degassing mobile phase materials in chromatographic applications. This invention also relates to methods for degassing mobile phase materials.

BACKGROUND OF THE INVENTION

Many chemical applications, particularly analytical applications, which involve the use of liquid solvents, reactants, or the like wherein the presence of dissolved gases, particularly air, is undesirable. An example of such an application relates to the mobile phase in high performance liquid chromatography where the presence of even small amounts of dissolved gases, and in particular oxygen, can interfere with the accuracy and sensitivity of the results obtained. For example, air dissolved in the mobile phase can manifest itself in the form of bubbles, with the bubbles causing measurement noise and drift as the mobile phase passes through a detector. If the dissolved species is chemically active, as in the case of oxygen in air, unwanted changes or deterioration in the mobile phase can occur. The detrimental effect of the dissolved species typically relates to the relative concentration of the species in the mobile phase. Such undesirable species are typically removed by a known degassing process. Correspondingly, it is desirable to utilize an efficient and effective degassing system to reduce dissolved gas concentration in respective mobile phases.

A number of techniques for degassing liquids have been developed, including heating or boiling the liquid to be degassed, exposing the material to a reduced pressure environment or vacuum, exposure to ultrasonic energy, or combinations thereof. As conventionally applied, however, these traditional techniques have generally fallen short of the desired degree of degassing efficiency.

Another technique that has been developed more recently is vacuum degassing through a membrane apparatus. A common such application utilizes a tubular length of relatively small diameter, thin-walled, semi-permeable synthetic polymer resin material contained within an enclosed chamber and held under a reduced pressure or vacuum. To perform the degassing, the liquid to be degassed is caused to flow through the chamber, thereby allowing gases to pass through the tube while preventing the liquid from doing so. In some applications, modules employing relatively flat gas-permeable membranes have been utilized for degassing various liquids.

Systems developed to date, however, have a number of problems and limitations associated therewith. For instance, such systems typically need to be relatively large to obtain a desired level of degassing due to the relatively low degassing efficiency of such systems. In flat membrane applications, systems proposed to date require support-type structures to assist in supporting the membrane both in fabrication and use. Such support structures add complexity and cost to the degassing components, as well as introducing additional parts which may be susceptible to breakage in use. Furthermore, materials commonly utilized for such membranes have limited gas permeability characteristics whereby the membranes are desirably less than about 10 micrometers in thickness to provide adequate degassing functionality.

It is therefore a principle object of the present invention to provide a degassing system for degassing liquids in a highly efficient manner by utilizing a compact flat membrane degasser.

A further object of the present invention is to provide a compact degassing system for use in a liquid chromatography environment.

A still further object of the present invention is to provide a compact degassing system utilizing a self-supported, relatively flat membrane.

A yet further object of the present invention is to provide a compact degassing system utilizing a degassing membrane material which enhances degassing efficiency.

Another object of the present invention is to provide a method for casting and attaching a membrane to a supporting porous structure in a compact degassing system. Such a membrane/film structure constitutes a self-supporting film structure.

SUMMARY OF THE INVENTION

By means of the present invention, an improved flow-through degassing system utilizing a relatively flat membrane in a compact degassing component is provided for increasing the efficiency of degassing various mobile phases in liquid chromatography applications. Such improved degassing means is achieved by forming a self-supporting thin membrane in a compact degassing component, which membrane is gas-permeable and liquid-impermeable. Such efficiency is further achieved through the use of an improved membrane material, which is preferably a perfluorinated copolymer such as TEFLON AF™. Through the use of such copolymers, it has been determined that it is possible to increase the thickness of the membrane while retaining, or even improving upon, typical degassing performance. A particular advantage achieved through such an invention is the enhanced durability of such a self-supporting membrane, as well as elimination of the necessity to include distinct support structures for supporting the thin membrane in the degassing component. Such improvements are achieved without either reduction or compromise in degassing performance.

One embodiment of the degassing system of the present invention includes a degassing component having a degassing chamber therewithin, which chamber is divided into first and second portions by a self-supporting film, which is preferably gas-permeable and liquid-impermeable. The degassing component further includes fluid inlet and outlet channels which are in fluid communication with the first portion. The second portion of the degassing component is preferably accessible from a vacuum source. Preferably, the self-supporting film is between about 5 micrometers and about 500 micrometers in thickness, and more preferably between about 10 micrometers and about 125 micrometers in thickness. The film preferably comprises a perfluorinated copolymer, such as TEFLON AF™. The degassing component preferably includes a permeable diffusion layer in the second portion disposed adjacent to the film, and between the film and the vacuum source. In preferred embodiments, the self-supporting film is at least partially adhered to the diffusion layer, which diffusion layer is preferably a composite polymeric material.

In another aspect of the invention, the self-supporting film is preferably formed through a thermal process whereby the perfluorinated copolymer is heated to a gel or molten phase and cast in the degassing chamber, and thereafter allowed to cool to form a self-supporting film. Most preferably, the heated perfluorinated copolymer is cast directly onto the diffusion layer, and thereafter allowed to cool to form the self-supporting film at least partially adhered to the diffusion layer.

An additional aspect of the present invention includes forming the self-supporting film through a solvent welding process whereby the perfluorinated copolymer is solvated in an appropriate solvent and subsequently cast in the degassing chamber, and thereafter dried to form the self-supporting film which is at least partially adhered to the diffusion layer.

BRIEF DESCRIPTION OF THE DRAWINGS

FIG. 8 is a cross-sectional view of an embodiment of the degassing component of the present invention.

DETAILED DESCRIPTION OF THE PREFERRED EMBODIMENTS

The objects and advantages enumerated above together with other objects, features and advances represented by the present invention will now be presented in terms of detailed embodiments described with reference to the attached drawing figures which are intended to be representative of various possible configurations of the invention. Other embodiments and aspects of the invention are recognized as being within the grasp of those having ordinary skill in the art.

Figure 1:
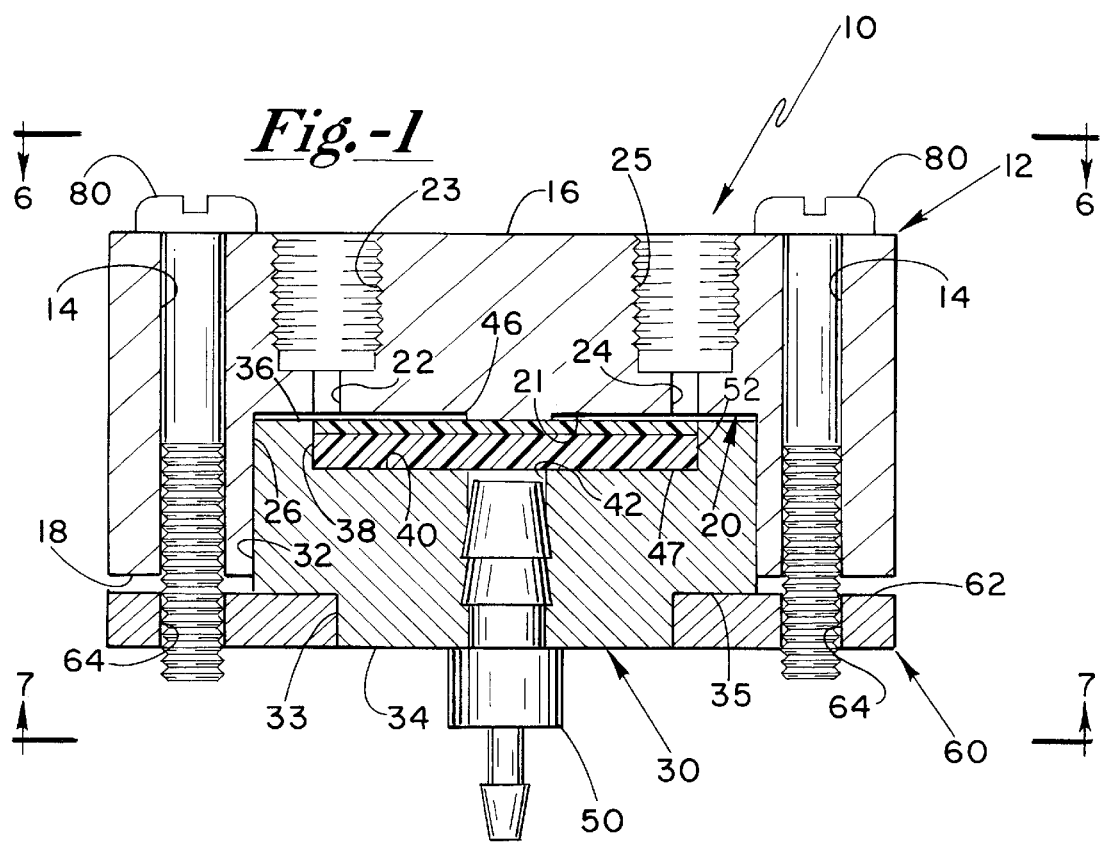
FIG. 1 is a cross-sectional view of the degassing component of the present invention.

Referring now by characters of reference to the drawings and first to FIG. 1, a degassing component 10 is shown. Degassing component 10 is preferably configured for use in a high performance liquid chromatography apparatus. Degassing component 10 preferably includes a housing 12 having a plurality of securing bores 14 extending therethrough. Housing 12 includes an upper surface 16 and a generally opposing lower surface 18. Securing bores 14 preferably extend between upper surface 16 and lower surface 18, thereby forming open channels extending through housing 12.

Figure 2:
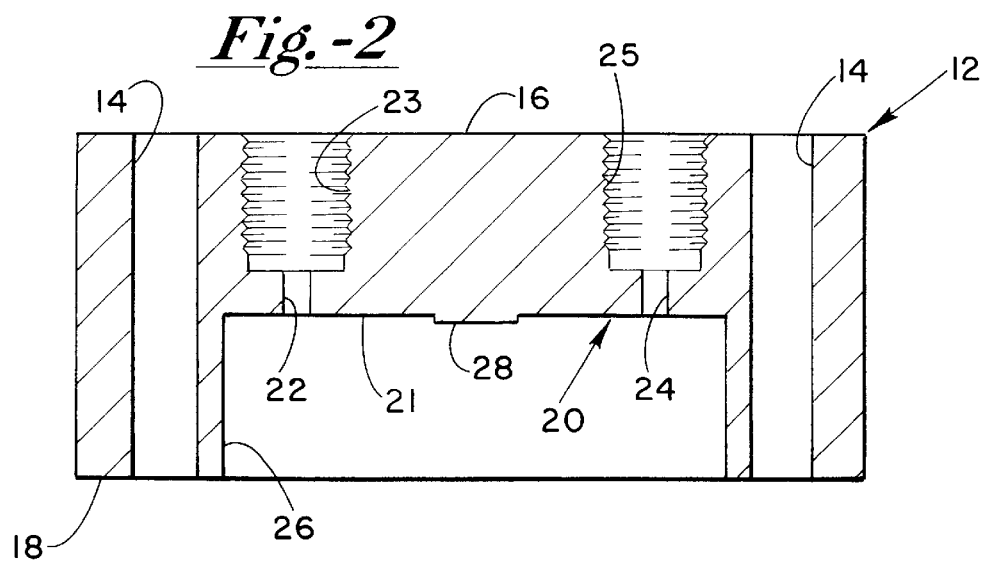
FIG. 2 is a cross-sectional view of a housing of the degassing component shown in FIG. 1.

Housing 12 may be more easily viewed in FIG. 2, which shows the housing alone. As shown in FIG. 2, a portion of lower surface 18 is recessed toward upper surface 16. Such recessed portion 20 includes an upper surface 21, which surface 21 is preferably substantially parallel to lower surface 18, and said recessed portion 20 is centrally disposed in housing 12. In preferred embodiments, housing 12 further includes an inlet channel 22 and an outlet channel 24 for transporting mobile phases through housing 12. Inlet and outlet channels 22, 24 preferably extend between upper surface 16 and recessed portion 20 of housing 12. As shown in FIG. 2, inlet and outlet channels 22, 24 are preferably spaced apart to distally opposed sections of recessed portion 20. Inlet and outlet channels 22, 24 may include respective threaded portions 23, 25 for receiving fluid transport tube connectors therein.

Housing 12 is preferably fabricated from an inert and durable material such as stainless steel. Other materials, however, which display such characteristics may also be used in the fabrication of housing 12.

Referring back to FIG. 1, an insert portion 30 is disposed in recessed portion 20 of housing 12. Side surface 32 of insert portion 30 is preferably in face-to-face relationship with side surface 26 of recessed portion 20. Preferably, insert portion 30 includes a lower surface 34 and an upper surface 36, which upper surface 36 preferably includes a recessed portion 38. In some embodiments, upper surface 36 is adjacent to, but separated from upper surface 21 of recessed portion 20, such that a gap 46 exists between upper surface 21 and upper surface 36. In other embodiments, upper surface 36 is substantially propinquant to upper surface 21 of recessed portion 20. As shown in FIG. 1, therefore, a degassing chamber 47 is formed between upper surface 21 of recessed portion 20 and lower surface 40 of recessed portion 38.

Insert portion 30 preferably further includes a vacuum channel 42 extending therethrough, whereby vacuum channel 42 extends between lower surface 34 and lower surface 40 of recessed portion 38. Vacuum channel 42 is preferably sized and configured to receive a vacuum adapter 50, which vacuum adapter is preferably operably connected to a vacuum pump (not shown).

Insert portion 30 is preferably fabricated from an inert and durable material, such as stainless steel. Other materials, however, may be used for insert portion 30 which exhibit such characteristics.

Degassing component 10 preferably also includes a diffusion member 52 disposed in recessed portion 38 of insert portion 30. In preferred embodiments, diffusion member 52 is in intimate contact with lower surface 40 of recessed portion 38, and substantially extends across a cross-section of recessed portion 38. As such, diffusion member 52 forms a diffusion layer between gap 46 and vacuum channel 42.

Diffusion member 52 is preferably porous, and is preferably fabricated from various porous materials. In a particular embodiment, diffusion member 52 is fabricated from a composite polymeric material, most preferably a composite of sintered PEEK and a perfluorinated copolymer such as PTFE Teflon. In other embodiments, diffusion member 52 may be fabricated from various ceramics, metals, or glasses. In preferred embodiments, about 50 percent of a respective cross-sectional area of diffusion member 52 is gas permeable.

Degassing component 10 preferably includes a securing flange 60 for securing insert portion 30 in recessed portion 20 of housing 12. Securing flange 60 preferably includes a central aperture for receiving a notch portion 33 of insert portion 30 therein. Securing flange 60 includes an upper surface 62, which upper surface 62 may be secured in intimate contact with a notch surface 35 of insert portion 30. Securing flange 60 preferably also includes securing apertures 64 extending therethrough for receiving securing fasteners 80 therein. Fasteners 80 act to direct securing flange 60 toward upper surface 16 of housing 12, to thereby secure insert portion 30 in recessed portion 20.

The present invention contemplates a number of securing techniques for securing insert portion 30 in recessed portion 20. Such techniques include providing a securing flange on insert portion 30 to receive fasteners 80 through securing apertures formed therein. External securing means may also be provided to secure insert portion 30 in recessed portion 20 of housing 12.

As illustrated in FIGS. 1 and 2, a protrusion 28 is formed in upper surface 21 of recessed portion 20. Such protrusion 28 acts as a stop for upward movement of the combined insert portion 30/diffusion member 52 while being secured in recessed portion 20. Thus, the extent that protrusion 28 extends from upper surface 21 of recessed portion 20 is the result in thickness of gap 46. Gap 46 is preferably dimensioned to provide a space for evenly distributed fluid flow between inlet channel 22 and outlet channel 24. Preferably, however, gap 46 is relatively narrow such that only a relatively thin layer of liquid may pass therethrough. Preferably, gap 46 is between about 50 micrometers and about 1000 micrometers in thickness, and more preferably between about 50 micrometers and 500 micrometers in thickness.

Figure 3:
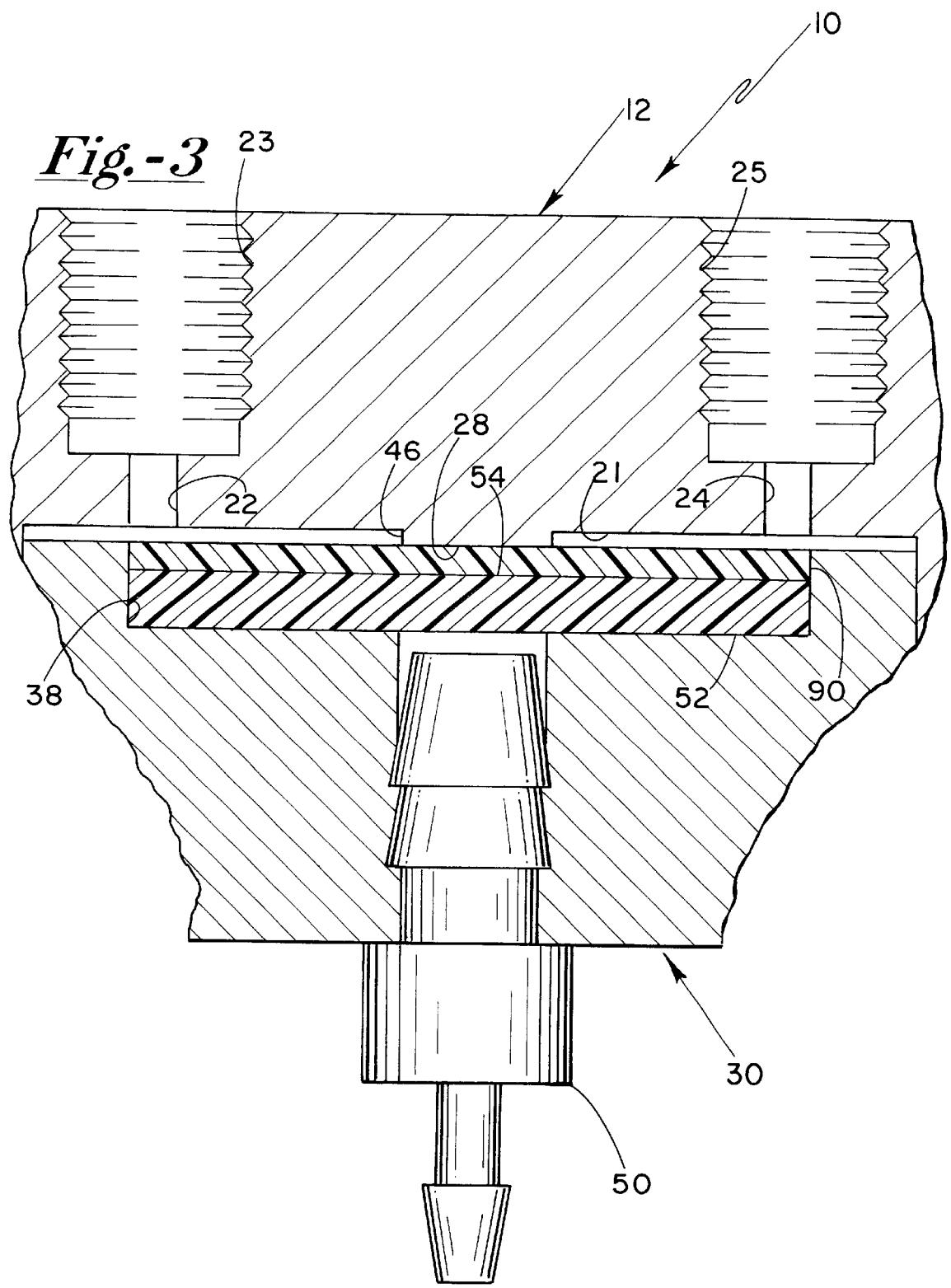
FIG. 3 is an enlarged cross-sectional view of a portion of the degassing component shown in FIG. 1.

As can be more easily seen in FIG. 3, degassing component 10 further includes a thin membrane 90 disposed between protrusion 28 and diffusion member 52 in recessed portion 38. In preferred embodiments, thin membrane 90 is a self-supporting membrane, whereby no support structures are necessary to form or maintain membrane 90.

Membrane 90 is preferably a gas-permeable, liquid-impermeable material which may be disposed on an upper surface 54 of diffusion member 52 to selectively degas liquids flowing in gap 46. Gas in the respective fluid may be selectively drawn out of the bulk fluid through gas-permeable membrane 90, by a negative pressure created by the vacuum pump. The vacuum pump creates a negative pressure throughout porous diffusion member 52, such that gas may be selectively drawn through membrane 90.

Membrane 90 may be fabricated from a variety of materials which may be cast as a gas-permeable, liquid-impermeable thin film. In a particularly preferred embodiment, however, membrane 90 is a perfluorinated copolymer, most preferably TEFLON AF™. TEFLON AF™ is a preferred material for membrane 90 due to its superior permeability characteristics, which allow a substantially thicker membrane to retain desired degassing performance. Membrane 90 is preferably between about 5 micrometers and about 500 micrometers, and more preferably between about 10 micrometers and about 125 micrometers thick. Membrane 90 having such thicknesses displays as good or superior degassing performance as compared to thin films in use today, which are commonly no more than about 10 micrometers thick. In addition, such membrane 90 may preferably be cast substantially free of pinholes to retain the liquid-impermeable characteristic.

Membrane 90 of the present invention may be preferably cast as a self-supporting entity on upper surface 54 of diffusion member 52. Therefore, membrane 90 may be formed and maintained in degassing component 10 without the use of distinct support structures. As a result of such a self-supporting characteristic, membrane 90 is less susceptible to pressure variations in component 10, which pressure variations may result from vacuum pump deviations or mobile phase flow variations.

In a particular embodiment, the vacuum pump may be set to create a negative pressure of about 14 pounds per square inch, which draws membrane 90 against upper surface 54 of diffusion member 52 at such a pressure. In such an embodiment, diffusion member 52 is configured such that sufficient surface area along upper surface 54 exists between respective pores so that risk of damage to membrane 90 is minimized. To further minimize such damage risk, membrane 90 may be correspondingly thicker while maintaining a desired level of degassing performance.

In preferred embodiments, membrane 90 is at least partially adhered to upper surface 54 of diffusion member 52. In such embodiments, a portion of membrane 90 is mechanically bonded to diffusion member 52. Such mechanical bonding is preferably achieved without the use of a bonding agent.

The material of membrane 90 may be cast onto diffusion member 52 through a variety of processes. In a particular embodiment, TEFLON AF™ 2400 is cast as a film by solvating the TEFLON AF™ in an appropriate solvent, such as Ausimont PFS-1, and subsequently drying the solution at about 200° C. The TEFLON AF™ is then allowed to cool as a self-supporting membrane.

An additional volume of TEFLON AF™ 2400 is supersaturated in solvent such as Ausimont PFS-1 and heated to a gel state (about 40° C.). The gel is subsequently coated on diffusion member 52. The cast film is preferably pressed and held against the gel, which causes the gel to bond with the cast film and to at least partially permeate diffusion member 52. The permeated gel preferably mechanically bonds to diffusion member 52. The solvating solution is then allowed to evaporate at 200° C. for 24 hours, leaving a coating of perfluorinated copolymer on and mechanically bonded to diffusion member 52. Such a process may be repeated as desired to form a membrane 90 of desired thickness.

Membrane 90 may also be formed by heating perfluorinated copolymer above its glass transition temperature ($T_g$) and subsequently pressing the molten copolymer onto upper surface 54 of diffusion member 52. The molten copolymer is then allowed to cool to form membrane 90.

In preferred embodiments, the membrane, while in a gel or slurry, may be mechanically pressed against diffusion member 52 such that a portion of the membrane material is mechanically bonded with diffusion member 52 in respective pores of diffusion member 52 to create a higher degree of adhesion therebetween. In preferred embodiments, a single continuous surface of membrane 90 is preferably at least partially adhered to diffusion member 52 such that the gas permeability characteristics of membrane 90 and diffusion member 52 are not adversely affected. A particular advantage of adhering membrane 90 to diffusion member 52 is the enhanced durability of membrane 90 when exposed to variable pressure conditions within degassing component 10.

Figure 4:
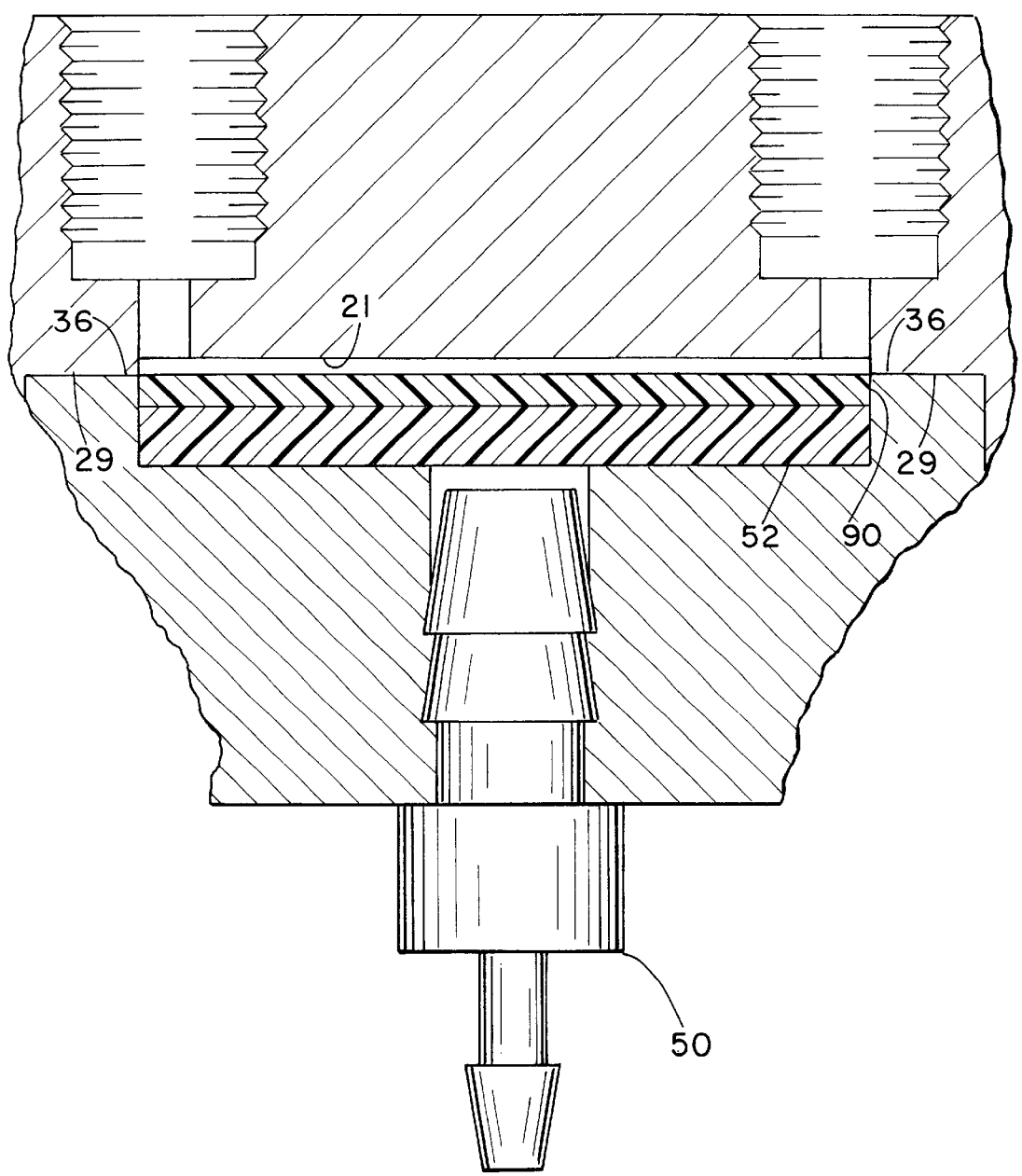
FIG. 4 is an enlarged cross-sectional view of an alternative embodiment of the degassing component illustrated in FIG. 1.

Another embodiment of the present invention is shown in FIG. 4, wherein protrusions 29 extending from upper surface 21 of recessed portion 20 are formed outwardly of inlet and outlet channels 22, 24 such that protrusions 29 act as a stop by abutting upper surface 36 of insert portion 30 when insert portion 30 is secured in housing 12.

In a further embodiment illustrated in FIG. 8, an outer portion 92 of membrane 90 is disposed between protrusions 29 and upper surface 36 of insert portion 30. As such, preferred liquid-tight sealing of insert portion 30 and housing 12 to membrane 90 may be accomplished at outer portion 92.

Figure 5:
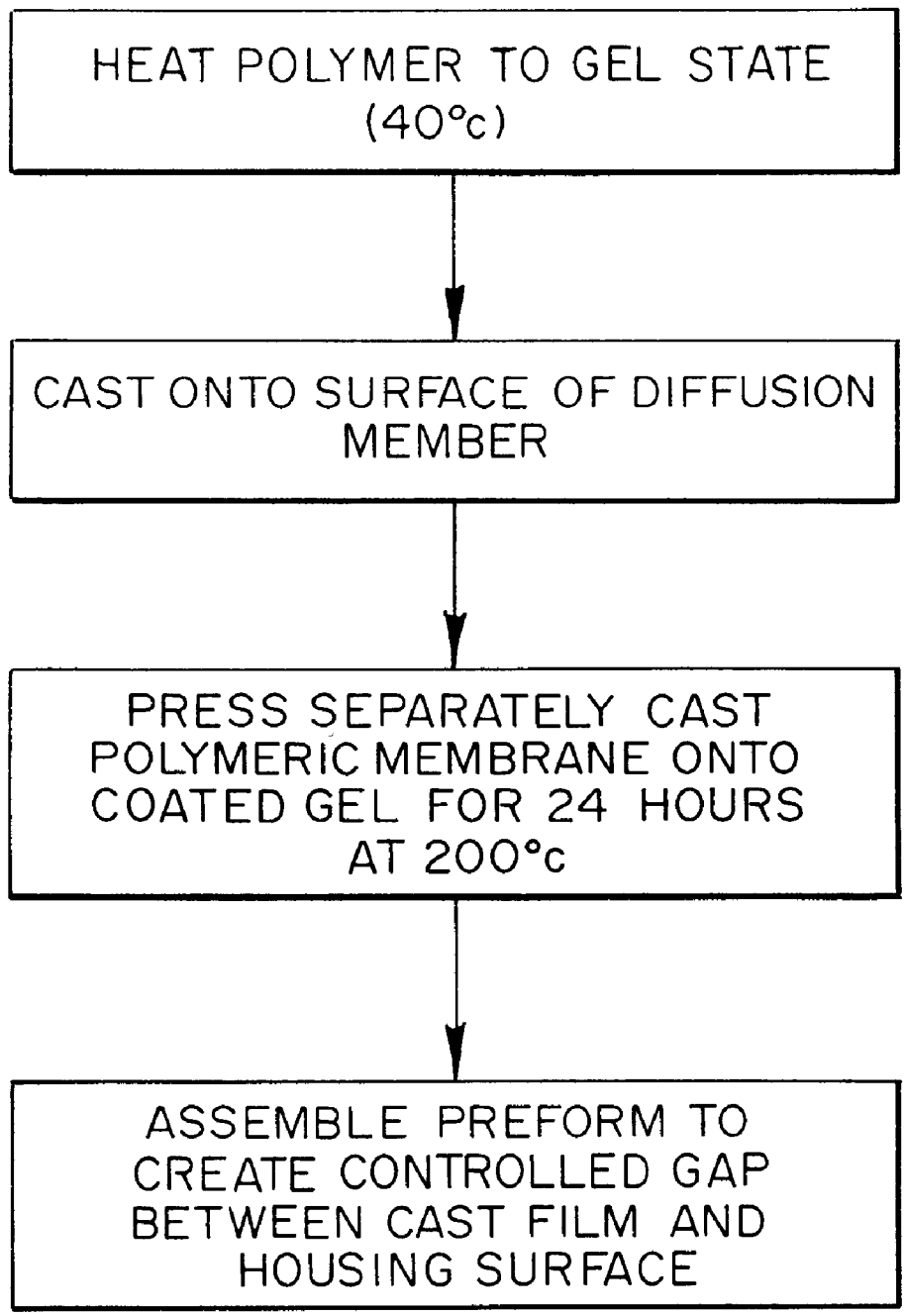
FIG. 5 is a flow chart describing a method of forming a self-supporting membrane of the present invention.

As reflected in the flow chart of FIG. 5, a preferred method of forming the degassing component 10 of the present invention includes heating a desired polymer for use as membrane 90 to a molten or gel state (about 40° C.), and subsequently casting such gel directly onto upper surface 54 of diffusion member 52. A separately cast polymeric membrane is pressed onto the gel layer and held for about 24 hours at about 200° C. Insert portion 30 is then secured into housing 12 such that gap 46 is created between upper surface 36 of insert portion 30 and upper surface 21 of recessed portion 20.

Figure 6:
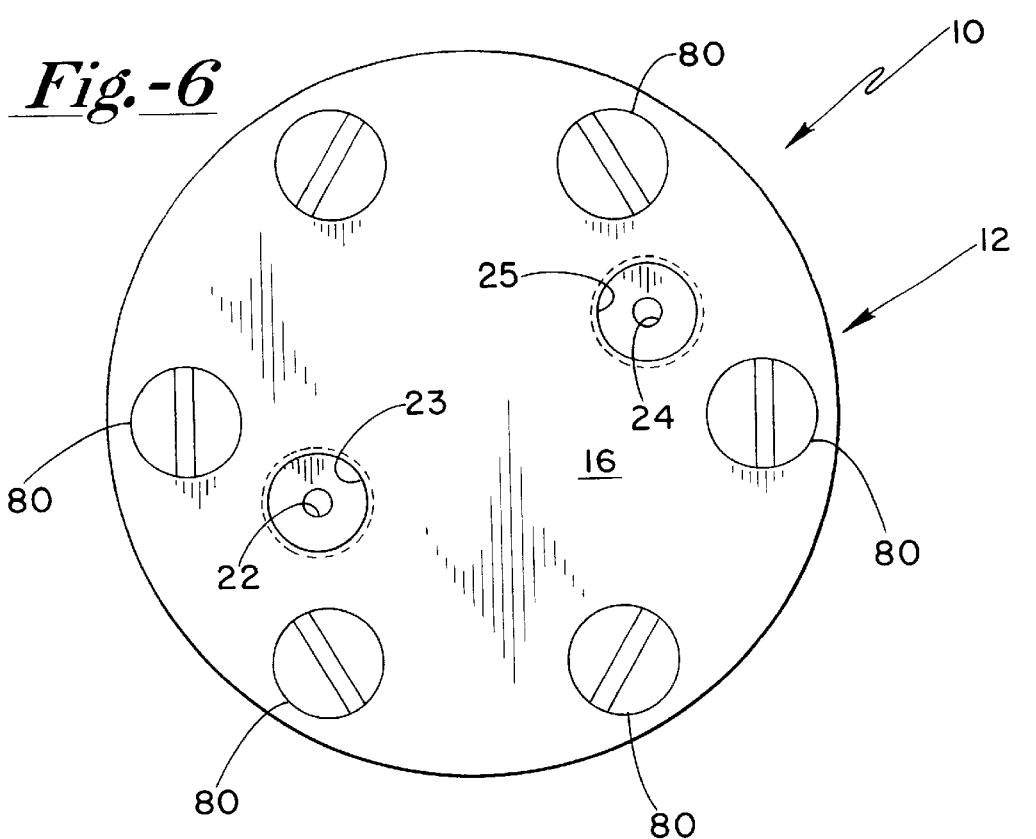
FIG. 6 is a top view of the degassing component illustrated in FIG. 1.
Figure 7:
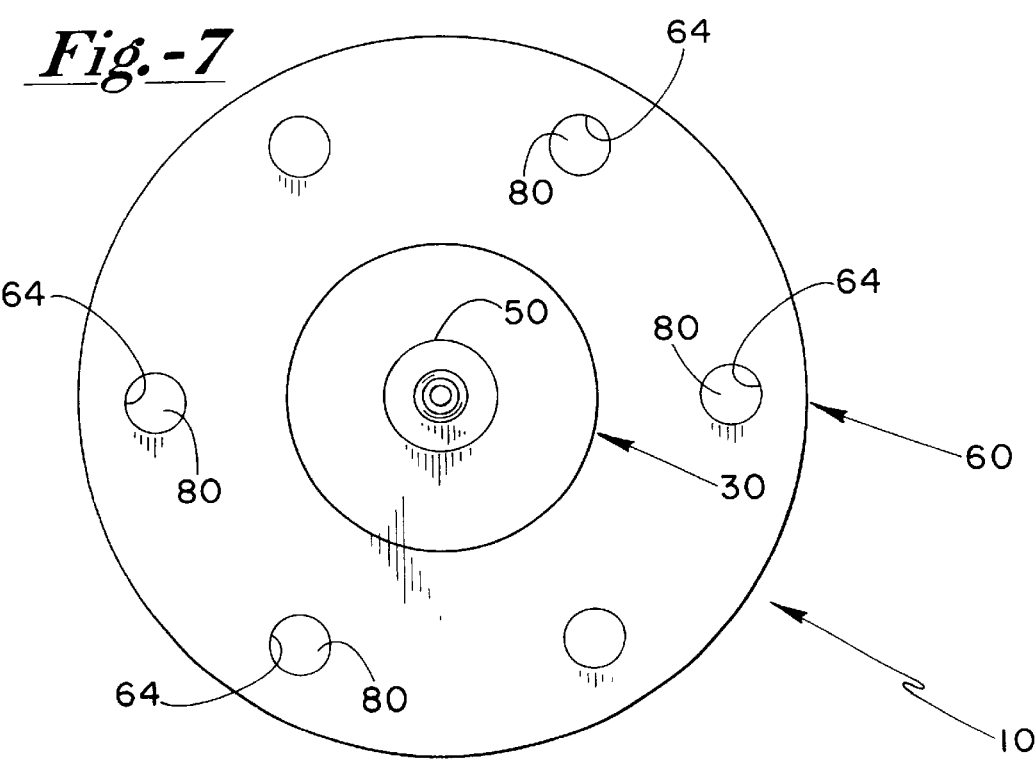
FIG. 7 is a bottom view of the degassing component illustrated in FIG. 1.

FIG. 6 represents a top view of degassing component 10, in particular, a top view of housing 12. FIG. 7 is a bottom view of degassing component 10 showing securing flange 60 and insert portion 30 held therewithin.

The invention has been described herein in considerable detail in order to comply with the patent statutes, and to provide those skilled in the art with the information needed to apply the novel principles and to construct and use embodiments of the invention as required. However, it is to be understood that the invention can be carried out by specifically different devices and that various modifications can be accomplished without departing from the scope of the invention itself.

What is claimed is:

1. A degassing system, comprising:

a degassing component having a degassing chamber therewithin, such a chamber being divided into first and second portions by a self-supporting film, said film being cast into the chamber without support structures as a gas-permeable and liquid-impermeable membrane, and fluid inlet and outlet channels in fluid communication with the first portion, with the second portion being accessible from a vacuum source.

2. A degassing system as in claim 1 wherein said film is between about 5 micrometers and about 500 micrometers in thickness.

3. A degassing system as in claim 1 wherein said film is between about 10 micrometers and about 125 micrometers in thickness.

4. A degassing system as in claim 1 wherein said film comprises a perfluorinated copolymer.

5. A degassing system as in claim 4, including a liquid-impermeable diffusion layer disposed adjacent to said film between said film and said vacuum source.

6. A degassing system as in claim 5 wherein said film is at least partially adhered to said diffusion layer.

7. A degassing system as in claim 5 wherein said diffusion layer comprises a composite polymeric material.

8. A degassing system as in claim 5 wherein said diffusion layer comprises a ceramic material.

9. A method for creating a membrane degassing system, comprising:

a) solvating perfluorinated copolymer in a solvent to form a first solution;

b) drying said first solution to form a first membrane layer;

c) solvating additional volume of perfluorinated copolymer in a solvent to form a second solution;

d) heating said second solution to a gel state;

e) coating said gel on a permeable substrate;

f) pressing said first membrane layer against an upper surface of said gel such that said gel is disposed between said first membrane layer and said permeable substrate; and g) drying said gel, such that mechanical bonding is created between said first membrane layer and said permeable substrate to thereby form a self-supporting film disposed on said permeable substrate.

10. A method as in claim 9 wherein said gel is dried for about 24 hours at about 200° Celsius.

11. A method as in claim 9, wherein said self-supporting film is between about 5 and about 500 micrometers thick.

12. A method as in claim 9, including continuously pressing said first membrane layer against said upper surface of said gel throughout a time period associated with drying said gel.

13. A method for casting a self-supporting membrane in a degassing apparatus, comprising:

a) heating perfluorinated copolymer to a temperature higher than its corresponding glass-transition temperature to create a molten copolymer;

b) placing said molten copolymer on an upper surface of a permeable substrate; and c) allowing said molten copolymer to cool, thereby forming said self-supporting membrane.

14. A method as in claim 13, including pressing said molten copolymer against said permeable substrate to mechanically bond said membrane to said permeable substrate.

* * * * *

UNITED STATES PATENT AND TRADEMARK OFFICE
CERTIFICATE OF CORRECTION

PATENT NO. : 6,596,058 B2
DATED : July 22, 2003
INVENTOR(S) : Gerner et al.

Page 1 of 1

It is certified that error appears in the above-identified patent and that said Letters Patent is hereby corrected as shown below:

<u>Title page,</u>
Item [73], Assignee, "Systec, Inc., New Brighton, MN (US) --

Signed and Sealed this

Twenty-fifth Day of November, 2003

JAMES E. ROGAN
*Director of the United States Patent and Trademark Office*